US005994920A

United States Patent [19]
Narayana et al.

[11] Patent Number: 5,994,920
[45] Date of Patent: *Nov. 30, 1999

[54] HALF-FULL FLAG GENERATOR FOR SYNCHRONOUS FIFOS

[75] Inventors: Pidugu L. Narayana; Andrew L. Hawkins, both of Starkville, Miss.

[73] Assignee: Cypress Semiconductor Corp., San Jose, Calif.

[*] Notice: This patent is subject to a terminal disclaimer.

[21] Appl. No.: 08/955,809

[22] Filed: Oct. 22, 1997

Related U.S. Application Data

[63] Continuation of application No. 08/666,751, Jun. 19, 1996, Pat. No. 5,844,423, which is a continuation-in-part of application No. 08/572,623, Dec. 14, 1995, Pat. No. 5,627,797.

[51] Int. Cl.$^6$ .................................................. H03K 19/00
[52] U.S. Cl. .............................. 326/46; 326/93; 365/221
[58] Field of Search ................................ 326/46, 93, 40; 365/189.12, 219, 221

[56] References Cited

U.S. PATENT DOCUMENTS

| | | | |
|---|---|---|---|
| 4,467,443 | 8/1984 | Shima | 395/416 |
| 4,802,122 | 1/1989 | Auvinen et al. | 365/154 |
| 4,833,651 | 5/1989 | Seltzer et al. | 365/189.07 |
| 4,839,866 | 6/1989 | Ward et al. | 365/221 |
| 4,847,812 | 7/1989 | Lodhi | 365/221 |
| 4,864,543 | 9/1989 | Ward et al. | 365/221 |

(List continued on next page.)

FOREIGN PATENT DOCUMENTS

| | | |
|---|---|---|
| 1-113996 | 5/1989 | Japan . |
| 6-76559 | 3/1994 | Japan . |

OTHER PUBLICATIONS

K. Kittrell, 1Kx9X2 Asynchronous FIFOs SN74ACT2235 and SN74ACT2236, Sep. 1995, 1–3,5–9.

P. Forstner, FIFOs With a Word Width of One Bit, First–In, First–Out Technology, Mar. 1996, pp. 1–24.

T. Jackson, FIFO Memories: Solution to Reduce FIFO Metastability, First–In, First–Out Technology, Mar. 1996, pp. 1–6.

T. Jackson, Advanced Bus–Matching/Byte–Swapping Features for Internetworking FIFO Applications, Mar. 1996, pp. 1–3, 5–12.

T. Jackson, Parity–Generate and Parity–Check Features for High–Bandwidth–Computing FIFO Applications, Mar. 1996, pp. 1–3, 5–8.

T. Ishii et al., High–Speed, High–Drive SN74ABT7819 FIFO, Mar. 1996, pp. 1–3, 5–12.

C. Wellheuser et al., Internetworking the SN74ABT3614, Mar. 1996, pp. 1–21.

C. Wellheuser, Metastability Performance of Clocked FIFOs, 1996, pp. 1–3, 5–12.

High Speed CMOS 256 x 36 x 2 Bi–direction FIFO, QS725420A, MDSF–00018–01, Apr. 24, 1995, pp. 1–36.

(List continued on next page.)

*Primary Examiner*—Jon Santamauro
*Attorney, Agent, or Firm*—Christopher P. Maiorana, P.C.

[57] ABSTRACT

The invention concerns an asynchronous state machine with a programmable tSKEW which may be used to generate a half-empty and half-full flags in a synchronous FIFO buffer. The present invention may reduce the delay associated in producing the half-full or half-empty flags from a typical eight gate delays, to as little as no gate delays. The reduction may be accomplished by using a first state machine which can make an internal flag go low, or active, and a second state machine which can make the internal flag go high, or inactive. The functioning of the first and second state machines may be controlled by a blocking logic. The output of each of the state machines may be stored in a latch. The output of the latch may be presented to an input of the blocking logic, which may be used by the blocking logic to control the activity of the state machines.

33 Claims, 4 Drawing Sheets

U.S. PATENT DOCUMENTS

| | | | |
|---|---|---|---|
| 4,875,196 | 10/1989 | Spaderna et al. | 365/238 |
| 4,888,739 | 12/1989 | Frederick et al. | 365/211 |
| 4,891,788 | 1/1990 | Kreifels | 365/49 |
| 4,942,553 | 7/1990 | Dalrymple et al. | 364/900 |
| 4,985,867 | 1/1991 | Ishii et al. | 365/221 |
| 5,021,994 | 6/1991 | Tai et al. | 364/900 |
| 5,079,693 | 1/1992 | Miller | 395/250 |
| 5,084,837 | 1/1992 | Matsumoto et al. | 395/250 |
| 5,088,061 | 2/1992 | Golnabi et al. | 365/189.01 |
| 5,121,346 | 6/1992 | McClure | 364/550 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 365/221 |
| 5,265,063 | 11/1993 | Kogure | 365/233 |
| 5,274,600 | 12/1993 | Ward et al. | 365/221 |
| 5,278,956 | 1/1994 | Thomsen et al. | 395/250 |
| 5,305,253 | 4/1994 | Ward | 365/73 |
| 5,311,475 | 5/1994 | Huang | 365/221 |
| 5,315,184 | 5/1994 | Benhamida . | |
| 5,317,756 | 5/1994 | Komatsu et al. | 395/800 |
| 5,325,487 | 6/1994 | Au et al. | 395/250 |
| 5,336,938 | 8/1994 | Sywyk | 307/265 |
| 5,345,419 | 9/1994 | Fenstermaker et al. | 365/189.04 |
| 5,365,485 | 11/1994 | Ward et al. | 365/221 |
| 5,367,486 | 11/1994 | Mori et al. | 365/188.05 |
| 5,375,092 | 12/1994 | Taniguchi et al. | 365/221 |
| 5,381,126 | 1/1995 | McClure | 340/146.2 |
| 5,384,744 | 1/1995 | Lee | 365/221 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,471,583 | 11/1995 | Au et al. | 395/250 |
| 5,473,756 | 12/1995 | Traylor | 395/250 |
| 5,487,049 | 1/1996 | Hang | 365/221 |
| 5,490,257 | 2/1996 | Hoberman et al. | 395/427 |
| 5,495,451 | 2/1996 | Cho | 365/221 |
| 5,502,655 | 3/1996 | McClure | 364/550 |
| 5,506,809 | 4/1996 | Csoppenszky et al. | 365/221 |
| 5,506,815 | 4/1996 | Hsieh et al. | 365/230.03 |
| 5,508,679 | 4/1996 | McClure | 340/146.2 |
| 5,513,318 | 4/1996 | van de Goor et al. | 395/185.01 |
| 5,515,330 | 5/1996 | Hattori et al. | 365/221 |
| 5,519,701 | 5/1996 | Colmant et al. | 370/60.1 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |
| 5,557,575 | 9/1996 | Lee | 365/221 |
| 5,587,962 | 12/1996 | Hashimoto et al. | 365/230.09 |
| 5,619,681 | 4/1997 | Benhamida et al. | 395/500 |
| 5,623,449 | 4/1997 | Fischer et al. | 315/200 |
| 5,625,842 | 4/1997 | Dalrymple | 395/842 |
| 5,627,797 | 5/1997 | Hawkins et al. | 365/221 |
| 5,636,176 | 6/1997 | Hashimoto et al. | 365/233 |
| 5,642,318 | 6/1997 | Knaack et al. | 365/201 |
| 5,661,418 | 8/1997 | Narayana et al. | 326/105 |
| 5,712,992 | 1/1998 | Hawkins et al. | 395/877 |
| 5,809,339 | 9/1998 | Hawkins et al. | 395/877 |
| 5,844,423 | 12/1998 | Narayana et al. | 326/46 |
| 5,850,568 | 12/1998 | Hawkins et al. | 395/877 |
| 5,852,748 | 12/1998 | Hawkins et al. | 395/874 |

OTHER PUBLICATIONS

High–Speed CMOS 4K x 9 Clocked FIFO with Output Enable, QS7244A, MDSF–00008–05, Jun. 6, 1995, pp. 1–12.

High–Speed CMOS 1K X 36 Clocked FIFO with Bus Sizing, QS723620, MDSF–00020–00, Jul. 17, 1995, pp. 1–36.

Cypress Preliminary CY7C 4425/4205/4215/ CY7C4225/ 4235/4245 64, 256,512, 1K, 2K,4K x 18 Synchronous FIFOS, pp. 5–67–5–82, May 1995.

HALF-FULL FLAG GENERATOR FOR SYNCHRONOUS FIFOS

This is a continuation of U.S. patent application Ser. No. 08/666,751, filed Jun. 19, 1996 now U.S. Pat. No. 5,844,423 which is a continuation-in-part of U.S. Ser. No. 08/572,623, filed Dec. 14, 1995, U.S. Pat. No. 5,627,797.

FIELD OF THE INVENTION

The present invention relates to FIFO buffers generally and more particularly, to an asynchronous state machine design to generate half-full flags in synchronous FIFO buffers.

BACKGROUND OF THE INVENTION

A synchronous first-in first-out (FIFO) buffer can include logic indicating when the FIFO is half-full. In a typical synchronous FIFO, the half-full status flag is updated by a single clock, typically a write clock. The logic to generate the half-full flags typically consists of counters, adders, combinatorial logic to generate a so called internal half-full flag and a final output register. An alternate way to generate the internal half-full flag is by directly decoding the counter outputs using combinatorial logic. A register is implemented which is typically a master-slave register. Typically the half-full flag is updated by the write clock.

The minimum delay between the clocks is defined as a tSKEW delay. An updating clock, either the write or read clock, is guaranteed to recognize the second clock, either the read or write clock, if it occurs at least tSKEW delay ahead of the updating clock. If the second (read) clock occurs within tSKEW time from the updating clock (write), the updating clock may or may not recognize the second clock.

Previous approach architectures suffer from very high tSKEW delays (~8–10 Gate Delays). Additionally these architectures also suffer from metastabilty problems introduced by the register trying to sample the asynchronous internal flag which is updated by both the asynchronous read and write clocks. The present invention solves both of these issues by providing very high MTBF and very short, even 0ns tSKEW. Additionally the present invention gives designers the flexibility to program the tSKEW to any desired value, including a 0ns tSKEW.

SUMMARY OF THE INVENTION

The invention concerns an asynchronous state machine with a programmable tSKEW which may be used to generate a synchronous half-full flag in a synchronous FIFO buffer. The present invention may reduce the delay associated in producing the half-full or half-empty flags by using a first state machine which can make the external flag go low, or active, and a second state machine which can make the external flag go high, or inactive. The functioning of the first and second state machines may be controlled by a blocking logic. The output of each of the state machine drives a set-reset (SR) latch. The output of the SR latch may be presented to an input of the blocking logic, which may be used to control the mutual exclusion of the state machines. Since the read half-full RhF and write half-full Whf input signals are mutually exclusive and since the half-full flag does not have a wall on either side of the boundary, additional blocking logic is not required.

Objects, features and advantages of the present invention include providing a system for generating a synchronous half-full flag for use with synchronous FIFO buffers. The present invention: (a) can produce the desired flags with extremely low tSKEW, (b) can break the conventional tSKEW barrier of eight-ten gate delays and (c) can be programmed to produce any desired tSKEW delay from as little as 0 ns.

It is another object of the present invention to provide a system for producing synchronous half-full flags which: (a) can be ported to other technologies with minimal effort, (b) can produce a consistent tSKEW delay which may be independent of the size of the FIFO buffer, (c) can have a very high MTBF, (d) can be used for the generation of both synchronous read and write half-full flags, (e) can require less simulation when compared to previous approach techniques and (f) can handle the various possible asynchronous clock transitions successfully.

BRIEF DESCRIPTION OF THE DRAWINGS

These and other objects, features and advantages of the present invention will be apparent from the following detailed description and the appended drawings and claims in which:

DETAILED DESCRIPTION OF THE PREFERRED EMBODIMENTS

Figure 1:
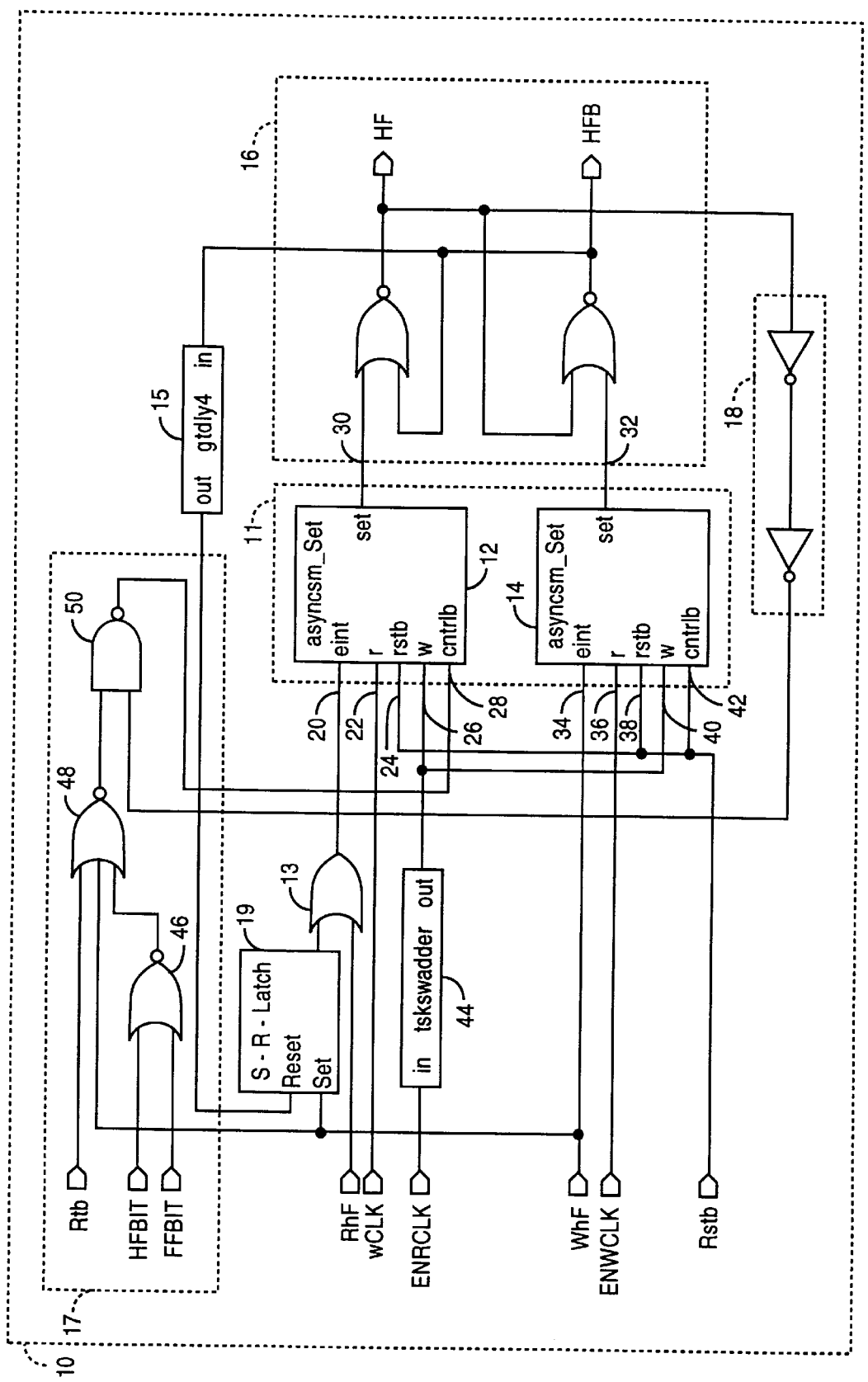
FIG. 1 is a block diagram of the overall flag generation architecture of a preferred embodiment of the present invention.

Referring to FIG. 1, a block diagram of the overall architecture of the flag generator 10 is shown. The flag generator 10 generally comprises a state machine block 11, a first state machine 12, a second state machine 14, a delay block 15, a latch 16, a retransmit logic 17, a blocking logic block 18 and a latch 19. The state machine 12 has a first input 20 which may receive a signal RhF from the latch 19. The signal RhF may represent a read half-full signal. A second input 22 may receive a signal wCLK which may represent an external free running write clock. A third input 24 may receive a signal Rstb which may represent a reset signal. A fourth input 26 may receive an enabled read clock ENRCLK which may represent a free running read clock. A fifth input 28 may receive a signal cntrlb which may represent a signal received from the retransmit logic block 17. The latch 19 may receive the signal RhF as well as a signal from delay block 15. The delay block provides, in one example, four state delays between the latch 16 and the latch 19. The latch 19 presents the signal RhF to the first state machine 12. The enabled read clock ENRCLK drives a counter generally having two built-in subcounters. A first subcounter is preferably an exact subcounter and starts counting from zero after a reset signal. A second subcounter is preferably a plus one counter which starts counting from a one after a reset. A look-ahead read half-full signal RhF, generally represents a signal which may be preferably generated externally from the state machines 12 and 14, but internally to the FIFO (not shown) and may be a result of a bitwise exclusive OR of the plus one read subcounter and the exact write subcounter. The output HF of the latch 16 may represent a half-full flag indicating when the FIFO is half-full. A full and empty flag generator for synchronous FIFOs is described in copending application Ser. No. 08/572,623, incorporated herein by reference in its entirety. The output HFB of the latch 16 represents a digital complement of the output HF. The half-full flags represented by the output HF and HFB are generally updated by the write clock. When the output 30 is active the state machine 12 may be enabled. The blocking logic block 18 controls the mutual exclusion of the state machines 12 and 14. The output 26 generally provides a signal which may set the latch 16. The latch 16 generally remains in a set state until the state machine 14 provides an output 32 which may reset the latch 16.

The state machine 14 has a first input 34 which may receive the write half-full signal WhF, a second input 36 which may receive an enabled write clock ENWCLK, a third input 38 which may receive a signal Rstb, a fourth input 40 which may receive an enabled read clock ENRCLK and a fifth input 42 which may receive the reset signal Rstb. The non-look-ahead half-full signal WhF generally represents a signal which may be generated externally from the state machines 12 and 14, but internally to the FIFO (not shown) and is generally a result of a bitwise exclusive OR of the exact read subcounter and the exact write subcounter.

The signal wCLK generally represents a free running externally generated write clock. The actual writing is generally performed by additionally providing a synchronous write enable input signal to the FIFO.

When the enable input is active in a clock cycle (internally to the FIFO) an enabled write clock may be generated.

The state machine 14 produces the output 28 which resets the latch 16. The blocking logic block 18 controls the functioning of the state machine 14. As a result, the state machine 14 only produces an output 28 when the FIFO is half-full. In contrast, no additional logic is required to control the set state machine 12 because, unlike the state machine 14, the state machine 12 has an enabled read clock ENRCLK as an input at input 22. The activity of each of the state machines 12 and 14 is mutually exclusive. For example, the machine 12 is active, the state machine 14 is generally frozen by the blocking logic block 18. The latch 16 may receive the output 30 and the output 32 and produces the signal HF and the signal HFB. A programmed tSKEW delay can be achieved by delaying the enabled write clock ENRCLK present at the input 26 of the state machine 12.

The input Rstb is generally an active low input. The external retransmit signal Rtb and the external master reset signal Rstb are input signals which generally provide a means to reset the flag generator 10 from an external source.

The fourth input 26 of the state machine 12 and the fourth input 40 of the state machine 14 may be delayed through a tSKEW programming block 44 which provides a programmable delay. The programmable delay can be implemented either electronically, or through discrete digital components, such as inverters. Other types of discrete digital components may be substituted in place of the inverters without departing from the scope of the present invention. Regardless of the delay system used, the presence of a delay from the tSKEW programming block 44 makes the tSKEW delay programmable by the designer to fit the design criteria of a particular application. If no tSKEW delay is desired, the tSKEW programming block 44 may be eliminated.

The retransmit logic block 17 further comprises a NOR gate 46, a NOR gate 48 and a NAND gate 50. The NOR gate 46 may receive the signal HFBIT and the signal FFBIT and presents an output to two inputs 49a and 49b of the NOR gate 48. The NOR gate 48 also may receive the signal Whf at the inputs 49a and 49b and the retransmit signal rtb at the third input 49c. The NOR gate 48 presents a signal to the NAND gate 50. The NAND gate 50 also may receive a signal from the logic block 18. The NAND gate 50 presents the signal cntrlb to the fifth input 28 of the state machine 12. The state machine 14 does not receive the output of the NAND gate 50 since the third input 38 and the fifth input 42 are generally tied together and generally receive the reset signal Rstb. As a result of the configuration of the NOR gate 46, the NOR gate 48, the NAND gate 50, the logic block 18 and the reset signal Rstb, only the state machine 12 receives a feedback signal from the latch 16.

Figure 2:
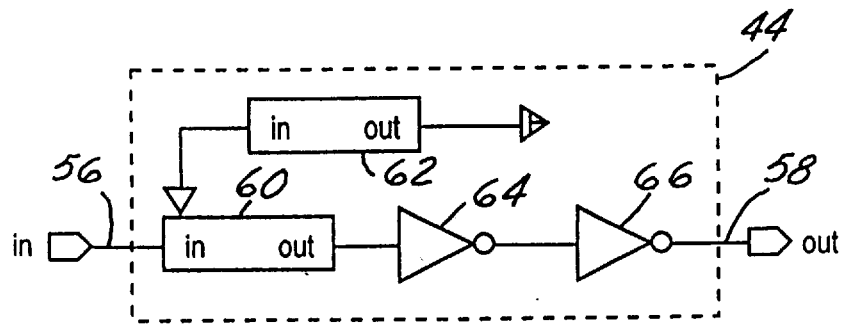
FIG. 2 is a block diagram of the programmable tSKEW delay.

Referring to FIG. 2, the tSKEW programming block 44 is shown in greater detail. The tSKEW programming block 44 has an input 56 which may receive the signal from the enabled read clock ENRCLK and an output 58 which is generally presented to the fourth inputs 26 and 40 of the machines 12 and 14, respectively. The input 56 may be presented to a gate delay block 60 which provides a programmable amount of delay. A gate delay block 62 provides a input to the gate delay block 60. The gate delay block 60 produces a signal which may be cascaded through an inverter 64 and an inverter 66 to produce the output 58.

Figure 3:
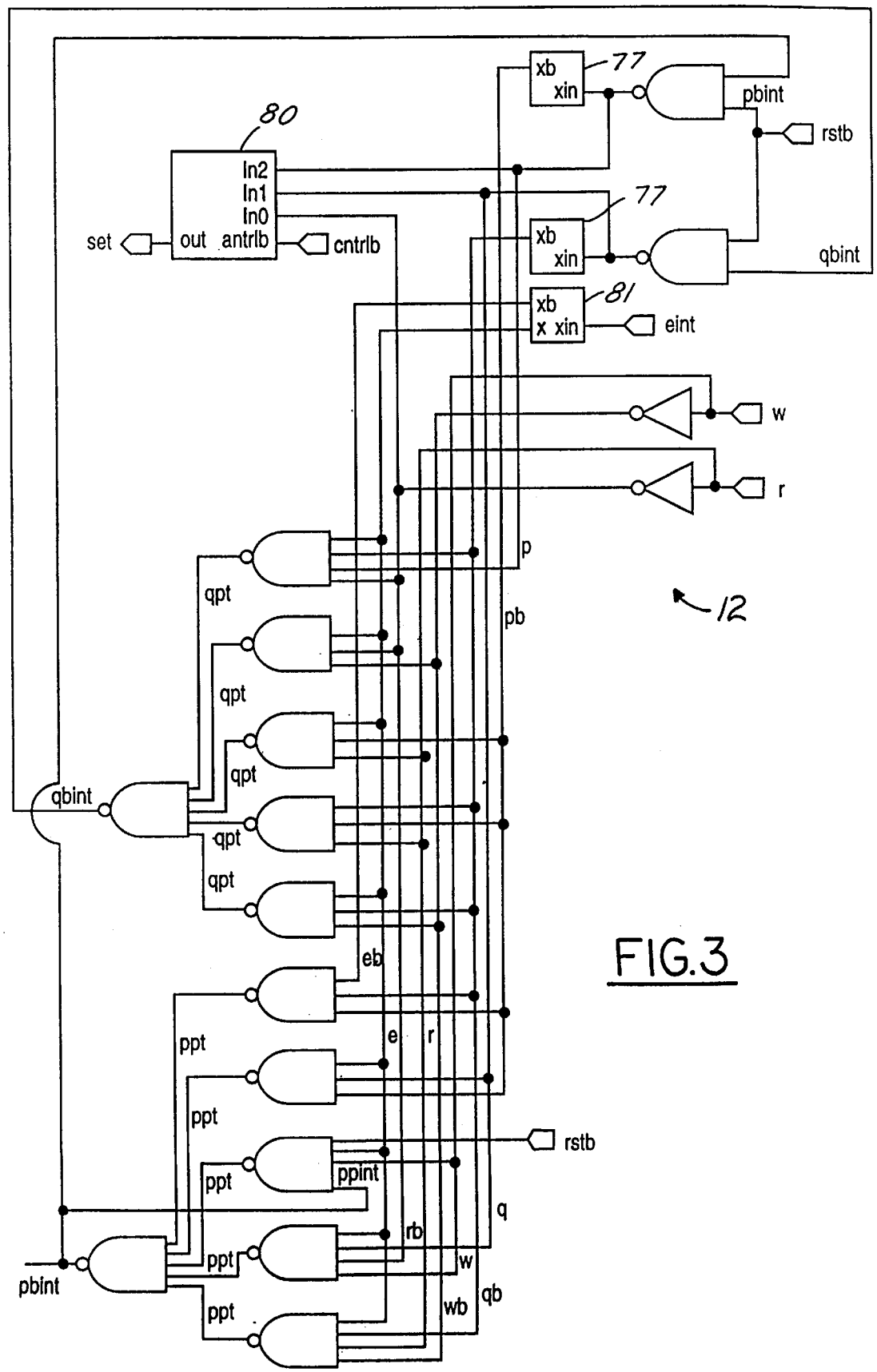
FIG. 3 is a schematic diagram of the state machines.

Referring to FIG. 3, a detailed schematic of the state machines 12 and 14 are shown. The state machine 12 has an input Eint, R, Rstb, W and cntrlb which may represent the inputs 20, 22, 24, 26 and 28 shown in FIG. 1. The input cntrlb is generally presented to a control block 68 which may produce the output 70. The state machines 12 and 14 and use non-overlapping clock generator blocks 72 (which are described in connection with FIG. 4A) to produce true and complement signals of necessary internal signals. The state machines 12 and 14 also includes a block 74 (which is described in connection with FIG. 4B). FIG. 3 illustrates one example of an implementation of the state machines 12 and 14. Other implementation can be substituted according to the design criteria of a particular application. Commercially available parts available from CYPRESS SEMICONDUCTOR, INC. include the 4245 and 4265 state machines.

Figure 4A:
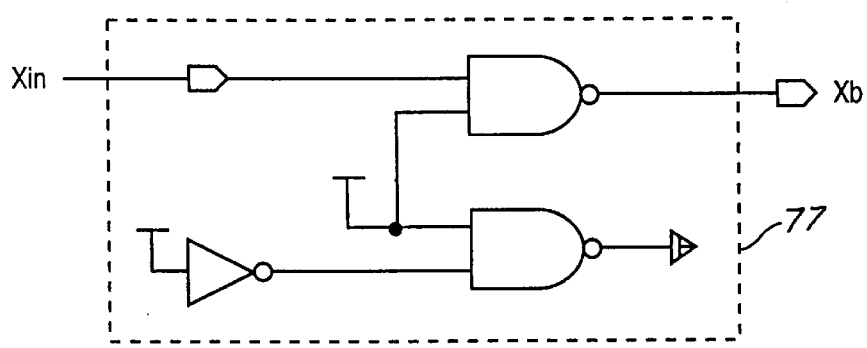
FIGS. 4A and 4B are diagrams of an example of the non-overlapping logic used for the clock generator state variables.
Figure 4B:
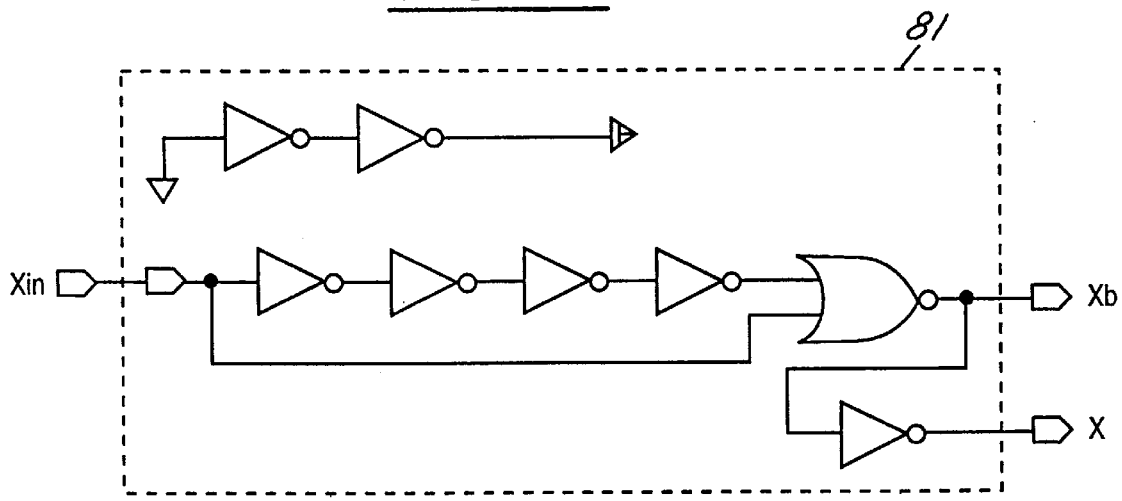

Referring to FIG. 4A and 4B, logic level diagrams showing the blocks 72 and 74 are shown. Both of the FIGS. 4A and 4B comprise a generic input labeled Xin and a generic output Xb. FIG. 4B also includes an output X which is generally equal to Xin. Both of the FIGS. 4A and 4B comprise discrete logic components. Any method for providing a true and complement signal may be used in place of FIGS. 4A and 4B without departing from the spirit of the invention.

Figure 5:
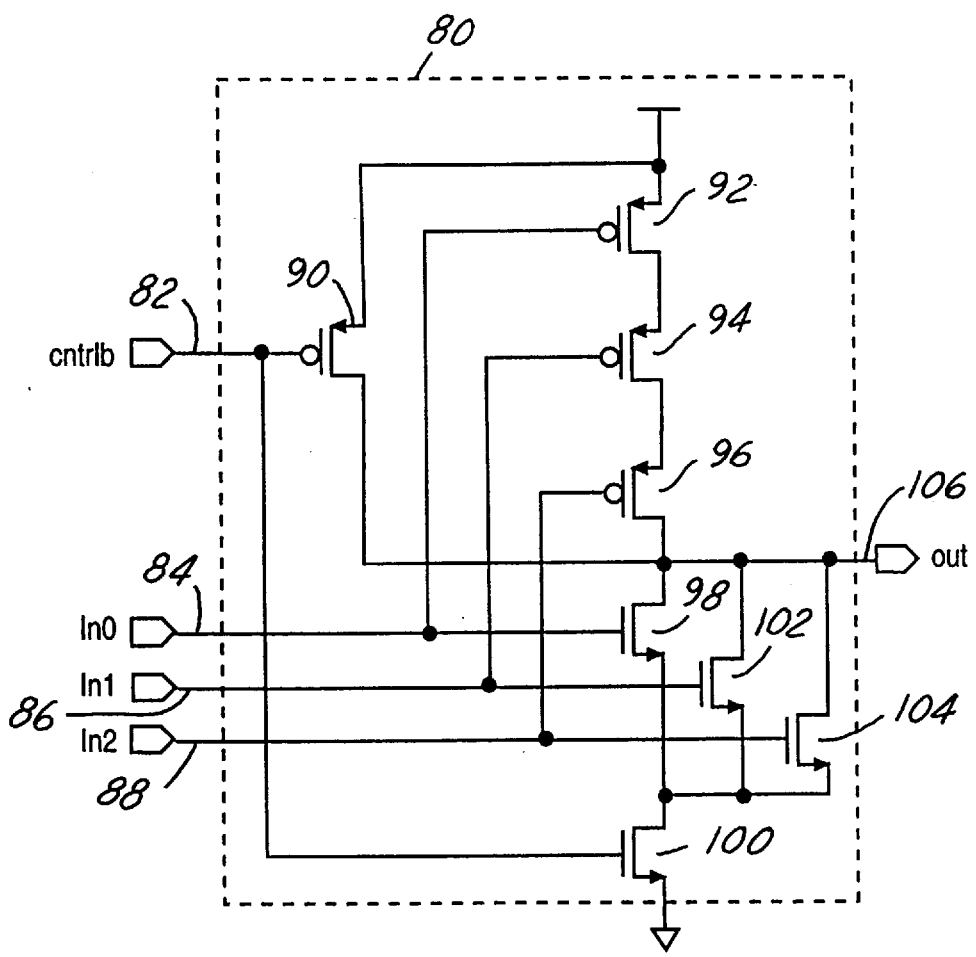
FIG. 5 is a schematic diagram of the logic used to produce the reset and retransmit functions.

Referring to FIG. 5, the control block 68 is shown in greater detail. The control block 68 has a first input which may receive a signal cntrlb, a second input 84 which may receive a signal NO, a third input 86 which may receive a signal IN1 and a fourth input 88 which may receive a signal IN2. The control block 68 comprises a transistor 90, a transistor 92, a transistor 94, a transistor 96, a transistor 98, a transistor 100, a transistor 102 and a transistor 104. The first input 82 is generally presented to a gate of the transistor 90 as well as to a gate of the transistor 100. The second input 84 is generally presented to a gate of the transistor 92 as well as to a gate of the transistor 98. The third input 86 is generally presented to a gate of the transistor 94 as well as to a gate of the transistor 102. The fourth input 88 is generally presented to a gate of the transistor 96 as well as to a gate of the transistor 104. The gates and sources of the transistors 92, 94, 96, 98 and 100 are generally cascaded together. The source of the transistor 92 is generally connected to the source of the transistor 90. The drain of the transistor 90 is generally coupled with the source of the transistor 98, the source of the transistor 102, the source of the transistor 104 and the drain of the transistor 96 to provide an output 106.

The logic of the state machines 12 and 14 is illustrated by the following TABLE 1:

TABLE 1

| Row # | 000 | 001 | 011 | 010 | 110 | 111 | 101 | 100 | Set |
|---|---|---|---|---|---|---|---|---|---|
| 0 |     | 1*  | 2   | 3*  | 4   | 5   | 6   | 7*  | 1 |
| 1 | 0*  |     | 2*  | 3   | 4   | 5   | 6*  | 7   | 1 |
| 2 | 0   | 1*  |     | 3*  | 4   | 5*  | 6   | 7   | 1 |
| 3 | 0*  | 1   | 2*  |     | 4*  | 5   | 6   | 7   | 1 |
| 4 | 0   | 1   | 2   | 3*  |     | 13* | 14* | 7*  | 1 |
| 5 | 0   | 1   | 2*  | 3   | 4*  |     | 6*  | 7   | 1 |
| 6 | 0   | 1*  | 2   | 3   | 4   | 5*  |     | 7*  | 1 |
| 7 | 0*  | 1   | 2   | 3   | XX* | 5   | 14* |     | 1 |
| 8 |     | 9*  | 10  | 3*  | 4   | 13  | 14  | 7*  | 0 |
| 9 | 0*  |     | 10* | 3   | 4   | 13  | 14* | 7   | 0 |
| 10 | 0  | 9*  |     | 3*  | 4   | 13* | 14  | 7   | 0 |
| 11 | 0* | 9   | 10* |     | 4*  | 13  | 14  | 7   | 0 |
| 12 | 0  | 9   | 10  | 3*  |     | 13* | 14  | 7*  | 0 |
| 13 | 0  | 9   | 10* | 3   | 4*  |     | 14* | 7   | 0 |
| 14 | 0  | 9*  | 10  | 3   | 4   | 13* |     | 7*  | 0 |
| 15 | 0* | 9   | 10  | 3   | 4*  | 13  | 14* |     | 0 |

The individual columns are labeled as a three bit binary value where the first bit, when the flag generator 10 is configured to generate a half-full flag, represents the look-ahead half-full signal RhF, the second bit represents the enabled read clock ENRCLK and the third bit represents the free running write clock wCLK. The column labeled Set represents the decoded output of the state machine 12.

A simplified version of TABLE 1 where redundant states are eliminated is shown in the following TABLE 2:

TABLE 2

| Row # | 000 | 001 | 011 | 010 | 110 | 111 | 101 | 100 | Set |
|---|---|---|---|---|---|---|---|---|---|
| 0–4(b) | A | A | A | A | b | A | A | c | 1 |
| 4(b) | a | a | a | a | B | d | d | d(c) | 1 |
| 7(c) | a | a | a | a | C | a | d | C | 1 |
| 8–15(d) | b(a) | D | D | b(a) | b | D | D | c | 0 |

The following TABLE 3 illustrates the reset and retransmit logic:

TABLE 3

| FF Bit | HF Bit | WH | RH | W Clock | R Clock | FIFO State |
|---|---|---|---|---|---|---|
| 1 | 0 | 0 | 0 | 1 | 1 | Full |
| 0 | 1 | 0 | 0 | 1 | 1 | >HF |
| 0 | 1 | 1 | 0 | 1 | 1 | =HF |
| 0 | 0 | 0 | 0 | 1 | 1 | <HF |

It should be appreciated that the present invention uses the state machine 12 and the state machine 14 which each handle two input clocks and a look-ahead signal. Each of the state machines 12 and 14 has four possible output states, as illustrated in TABLE 2. With design criteria requiring five input variables and eight output states, the implementation of two input state machines 12 and 14 is generally far less complex than the implementation of a single state machine capable of handling all combinations. Furthermore, the blocking logic block 18 is generally insignificant enough to maintain the simplicity of the set/reset implementation of the present invention. While the use of smaller, more efficient state machines 12 and 14 is generally superior using a single more complex state machine, the present invention can be implemented using a single larger state machine without departing from the spirit of the present invention.

While the invention has been particularly shown and described with reference to preferred embodiments thereof, it will be understood by those skilled in the art that various changes in form and details may be made without departing from the spirit and scope of the invention.

We claim:

1. A circuit comprising:
    a state machine having a first input receiving a look-ahead signal, a second input receiving a write clock, a third input receiving a read clock, a fourth input receiving said write clock, a fifth input receiving an enabled write clock and a sixth input receiving said read clock, said state machine manipulating said inputs to produce an output representing the fullness of a FIFO buffer, wherein said output is at a one logic state when said FIFO buffer is half-full and is at another logic state when said FIFO buffer is not half-full.
2. The circuit according to claim 1 wherein said read clock is an enabled read clock.
3. An apparatus comprising:
    a first state machine receiving a write clock, a read clock and a first look-ahead signal, said first state machine producing a first output signal representing the fullness of a buffer, wherein said first output signal is either at a first logic state or at a second logic state;
    a second state machine receiving said write clock, said read clock and a second look-ahead signal, said second state machine producing a second output signal that is either at a first logic state or at a second logic state; and a latch circuit configured to hold said first and second output signals in mutually exclusive states.

4. The circuit according to claim 3 wherein said latch circuit comprises:

a first input receiving said first output signal, a second input receiving said second output signal, a third output signal equal to said first output signal and a fourth output signal equal to said second output signal, said latch circuit configured to hold said third and fourth output signals until said first and second output signals change logic states, said fourth output signal representing a status flag that is at one logic state when said buffer is half-full and is at another logic state when said buffer is not half-full.

5. The circuit according to claim 3 further comprising:

a reset circuit having a reset input receiving said first output signal and an output for resetting said first and second state machines.

6. The circuit according to claim 3 wherein said buffer is a FIFO buffer.

7. The circuit according to claim 3 wherein said buffer is a synchronous FIFO buffer.

8. The apparatus according to claim 3 wherein said read clock is an enabled free-running read clock.

9. The apparatus according to claim 3 wherein said write clock is a free-running write clock.

10. The apparatus according to claim 3 further comprising a delay circuit having an input receiving said read clock and an output presented to said first state machine, said delay circuit provides a predetermined tSKEW delay at said first output signal.

11. The apparatus according to claim 10 wherein said predetermined delay is configured during fabrication.

12. The apparatus according to claim 10 wherein said predetermined delay is programmable.

13. A method for indicating the fullness of a buffer comprising the steps of:

generating a first output in response to a write clock, a first read clock and a look-ahead signal;

generating a second output in response to a non look-ahead signal, a second read clock and a second write clock, wherein said first and second read clocks are the same or different and said first and second write clocks are the same or different; and generating a third output in response to a change of state in said first and second outputs, wherein said third output is at one logic state when said buffer is half-full and is at another logic state when said buffer is not half-full.

14. The method according to claim 13 further comprising the step of:

prior to said step of generating said first output, delaying said first read clock to produce a tSKEW delay.

15. The method according to claim 13 wherein said buffer is a synchronous FIFO buffer.

16. The method according to claim 13 wherein said first read clock is an enabled read clock.

17. The method according to claim 13 wherein said write clock is a free-running write clock.

18. The method according to claim 14 wherein said step of delaying said read clock produces a predetermined tSKEW delay.

19. The method according to claim 18 further comprising the step of programming said predetermined tSKEW delay.

20. The method according to claim 19 wherein said step of programming comprises electronically generating a signal that programs said predetermined tSKEW delay.

21. The method according to claim 13, wherein said third output comprises a status flag.

22. A circuit comprising:

a state machine configured to generate a status flag in a buffer in response to (i) a look-ahead signal, (ii) a free running write clock, (iii) a read clock and (iv) an enabled write clock, wherein said status flag is at a one logic state when said buffer is half-full and is at another logic state when said buffer is not half-full.

23. The circuit according to claim 22 wherein said read clock is an enabled read clock.

24. The circuit according to claim 22, wherein said read clock and said enabled write clock are presented to said buffer.

25. An apparatus comprising:

a first state machine configured to generate a first output signal in response to (i) a first write clock, (ii) a first read clock and (iii) a first look-ahead signal, wherein said first output signal represents whether a buffer is half-full or not half-full;

a second state machine configured to generate a second output signal in response to (i) a second write clock, (ii) a second read clock and (iii) a second look-ahead signal, wherein said first and second read clocks are the same or different and said first and second write clocks are the same or different; and a latch circuit configured to hold said first and second output signals in mutually exclusive states.

26. The circuit according to claim 25 further comprising:

a reset circuit configured to reset said first and second state machines in response to a reset input.

27. The circuit according to claim 25 wherein said buffer is a synchronous FIFO buffer.

28. The apparatus according to claim 25 further comprising a delay circuit configured to delay said read clock to generate a tSKEW delay at said first output signal.

29. The apparatus according to claim 28 wherein said tSKEW delay is programmable.

30. A method for indicating the status of a buffer comprising the steps of:

generating a status flag in response to (i) a write clock, (ii) a read clock and (iii) a look-ahead signal, wherein said status flag is at one logic state when said buffer is half-full and is at another logic state when said buffer is not half-full; and prior to said step of generating said status flag, delaying said read clock to generate a tSKEW delay.

31. The method according to claim 30 wherein said tSKEW delay is predetermined.

32. The method according to claim 30, wherein said status flag is generated in further response to a non look-ahead signal.

33. The method according to claim 30, further comprising the step of:

presenting said write clock, said read clock and said look-ahead signal to a state machine, wherein said state machine generates said status flag.

* * * * *